United States Patent
Swaminathan et al.

(10) Patent No.: US 10,629,964 B2
(45) Date of Patent: Apr. 21, 2020

(54) METHOD FOR OPERATING AN ENERGY STORAGE UNIT, BATTERY MANAGEMENT SYSTEM FOR PERFORMING SUCH A METHOD AND ENERGY STORAGE UNIT WITH SUCH A BATTERY MANAGEMENT SYSTEM

(71) Applicant: Robert Bosch GmbH, Stuttgart (DE)

(72) Inventors: Ramanathan Swaminathan, Stuttgart (DE); Frank Stimm, Leonberg (DE); Joerg Christoph Wilhelm, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 827 days.

(21) Appl. No.: 15/311,247

(22) PCT Filed: Apr. 27, 2015

(86) PCT No.: PCT/EP2015/059092
§ 371 (c)(1),
(2) Date: Nov. 15, 2016

(87) PCT Pub. No.: WO2015/173000
PCT Pub. Date: Nov. 19, 2015

(65) Prior Publication Data
US 2017/0110768 A1 Apr. 20, 2017

(30) Foreign Application Priority Data
May 16, 2014 (DE) .................. 10 2014 209 280

(51) Int. Cl.
| | |
|---|---|
| *H01M 10/44* | (2006.01) |
| *H01M 10/48* | (2006.01) |
| *H01M 2/34* | (2006.01) |
| *H01M 10/42* | (2006.01) |
| *B60L 3/00* | (2019.01) |
| *B60L 3/12* | (2006.01) |
| *B60L 58/22* | (2019.01) |
| *B60L 50/64* | (2019.01) |
| *B60L 58/21* | (2019.01) |
| *B60L 58/15* | (2019.01) |

(52) U.S. Cl.
CPC ......... *H01M 10/482* (2013.01); *B60L 3/0046* (2013.01); *B60L 3/12* (2013.01); *B60L 50/64* (2019.02); *B60L 58/15* (2019.02); *B60L 58/21* (2019.02); *B60L 58/22* (2019.02); *H01M 2/34* (2013.01); *H01M 10/425* (2013.01); *B60L 2240/547* (2013.01); *B60L 2240/549* (2013.01); *H01M 2010/4271* (2013.01); *H01M 2200/00* (2013.01); *H01M 2200/103* (2013.01);

*H01M 2220/20* (2013.01); *Y02T 10/7005* (2013.01); *Y02T 10/7061* (2013.01)

(58) Field of Classification Search
CPC ...... H02J 7/0014; H02J 7/0019; H02J 7/0026; H02J 7/0029; H02J 7/0034; H02J 7/0036
USPC ........ 320/116, 118, 128, 133, 134, 136, 150
See application file for complete search history.

(56) References Cited

U.S. PATENT DOCUMENTS

| | | |
|---|---|---|
| 5,670,861 A | 9/1997 | Nori |
| 2012/0034497 A1 | 2/2012 | Hermann et al. |
| 2012/0116699 A1 | 5/2012 | Haag et al. |
| 2012/0242144 A1 | 9/2012 | Chorian et al. |
| 2013/0342939 A1 | 12/2013 | Itou et al. |

FOREIGN PATENT DOCUMENTS

| | | |
|---|---|---|
| CN | 103718345 | 4/2014 |
| DE | 102011113798 | 5/2012 |
| DE | 102011002659 | 7/2012 |
| DE | 102012200868 | 7/2013 |
| DE | 102013106370 | 1/2014 |
| JP | 2010146773 | 7/2010 |

OTHER PUBLICATIONS

Machine translate of DE 10 2011113798 (Mar. 5, 2012) (Year: 2012).*
International Search Report for Application No. PCT/EP2015/059092 dated Aug. 6, 2015 (English Translation, 3 pages).

* cited by examiner

*Primary Examiner* — Edward Tso
(74) *Attorney, Agent, or Firm* — Michael Best & Friedrich LLP

(57) ABSTRACT

The present invention relates to a method for operating an energy storage unit having a plurality of battery cells (1) electrically connected to one another, each battery cell comprising an over-voltage protection device and a cell protection, wherein an adjacent battery cell voltage (14) on each battery cell (1) of the energy storage unit is monitored to determine whether said battery cell voltage is larger than a predetermined cell voltage minimum value (16), wherein the energy storage unit is switched off when the battery cell voltage (14) drops below the cell voltage minimum value (16). Thereby the battery cells (1) are monitored with respect to a triggering of the respective over-voltage protection devices, wherein the energy storage unit is further operated if a battery cell voltage (14) of a battery cell (1) of the energy storage unit exceeds the cell voltage minimum value (16) and the triggering of the over-voltage protection device of this battery cell (1) is thereby detected. The present invention further relates to a battery management system configured to carry out the method and an energy storage unit with such a battery management system.

10 Claims, 5 Drawing Sheets

METHOD FOR OPERATING AN ENERGY STORAGE UNIT, BATTERY MANAGEMENT SYSTEM FOR PERFORMING SUCH A METHOD AND ENERGY STORAGE UNIT WITH SUCH A BATTERY MANAGEMENT SYSTEM

BACKGROUND OF THE INVENTION

The invention relates to a method for operating an energy storage unit having a plurality of electrically interconnected battery cells that each comprise an overvoltage protection apparatus and a cell fuse, wherein a respective battery cell voltage applied to a battery cell of the energy storage unit is monitored for whether it is greater than a prescribed cell voltage minimum value, the energy storage unit being disconnected in the event of a drop in the battery cell voltage below the cell voltage minimum value.

Furthermore, the invention relates to a battery management system for monitoring and regulating operation of an energy storage unit having a plurality of electrically interconnected battery cells.

Moreover, the invention relates to an energy storage unit having a battery management system.

Energy storage units having a plurality of electrically interconnected battery cells are of great significance, particularly for electromobility. As such, battery systems having a plurality of secondary battery cells that are electrically interconnected to increase the power and/or capacity of the battery system are used as energy storage units in hybrid, plug-in hybrid and electric vehicles. In particular, this involves a plurality of battery cells being electrically connected up to form a battery module, with multiple battery modules in turn being connected up to form a battery system.

The battery cells used in such a battery system are lithium ion cells in prismatic form, in particular. During operation of the battery cells, particularly in the case of lithium ion cells, it is necessary to ensure that they are operated within certain operating limits in order to ensure a long life for the cells and the safety of the battery system. To this end, a battery system usually comprises a battery management system that is designed to monitor and regulate operation of the battery system.

In particular, multiple safety devices are known for battery systems or battery cells that, in the event of a fault or defect occurring, contribute to no risk being posed by the battery system.

By way of example, disorders such as overcharging of the battery cell during a charging process can lead to critical heating of the battery cell, which can end in thermal runaway of the battery cell. In particular, unwanted chemical reactions then start in the battery cell. As such, the electrolyte required for ion transport between the anode and the cathode of a battery cell can break down and change to a gaseous state as a result of the critical heating.

In order to prevent such gas formation in a rechargeable battery cell as a result of overcharging of the battery cell, battery cells are known that have an overvoltage protection apparatus, also called an "overcharge safety device" (OSD). A battery cell having such an overvoltage protection apparatus is known from the documents DE 10 2011 002 659 A1 and DE 10 2012 200 868 A1, for example.

Disadvantageously, tripping of the overvoltage protection apparatus has to date immediately resulted in disconnection of the energy storage unit, particularly because the battery cell voltage of the affected cell then falls below a cell voltage minimum value and a fall in a battery cell voltage below a cell voltage minimum value is a fault state. When an energy storage unit used in an electric vehicle is disconnected, this disadvantageously results in the vehicle breaking down. It is then not possible to continue driving.

Against this background, it is an object of the invention to provide a method and means that allow improved operation of an energy storage unit having a plurality of electrically interconnected battery cells. In particular, the intention in this case is to reduce the occurrence of disconnection of an energy storage unit further, so that electric load devices, in particular hybrid, plug-in hybrid or electric vehicles, connected to the energy storage unit can advantageously be operated with additionally increased reliability.

SUMMARY OF THE INVENTION

The object is achieved by proposing a method for operating an energy storage unit having a plurality of electrically interconnected battery cells that each comprise an overvoltage protection apparatus and a cell fuse, wherein a respective battery cell voltage applied to a battery cell of the energy storage unit is monitored for whether it is greater than a prescribed cell voltage minimum value, the energy storage unit being disconnected in the event of a drop in the battery cell voltage below the cell voltage minimum value, and wherein the battery cells are monitored for a tripping of the respective overvoltage protection apparatus, wherein the energy storage unit continues to be operated when a battery cell voltage of a battery cell of the energy storage unit drops below the cell voltage minimum value and, in the process, tripping of the overvoltage protection apparatus of this battery cell is identified. That is to say that the method according to the invention involves the energy storage unit not being disconnected when a battery cell voltage drops below the prescribed cell voltage minimum value and additionally tripping of the overvoltage protection apparatus of this battery cell is identified.

The method according to the invention therefore makes use of the fact that in the case of a battery cell with a tripped overvoltage protection apparatus, a current can continue to flow via the housing of the battery cell. A voltage drop then still arises that is dependent on the value of the flowing current and on the material properties and the nature of the current path, that is to say particularly on the cell housing, the overvoltage protection apparatus and the contact area between the overvoltage protection apparatus and the cell housing. This voltage drop is then less than the prescribed cell voltage minimum value. Instead of disconnecting the energy storage unit on a drop below the cell voltage minimum value, however, which results in a breakdown particularly in the case of electric vehicles, it is now advantageously possible for the energy storage unit to continue to be operated when tripping of the overvoltage protection apparatus has been identified. The reason is that this advantageously makes it possible to rule out that the cause of the drop below a minimum voltage is an overcurrent that has occurred in the energy storage unit. Further operation of the energy storage unit can take place particularly at reduced power in this case.

In particular, there is provision for the energy storage unit to be a battery system that is designed to provide the electric power required for operation of a hybrid, plug-in hybrid or electric vehicle. The battery cells provided in this case are, in particular, secondary battery cells, that is say rechargeable storage battery cells, preferably lithium ion cells.

In lithium ion cells that are used at present, a prescribed cell voltage minimum value, which usually must not be undershot during operation of a battery cell, is 2.8 volts, for example. Furthermore, a cell voltage maximum value must usually not be exceeded in such a battery cell. Said cell voltage maximum value is particularly 4.2 volts in the case of lithium ion cells that are used at present.

The overvoltage protection apparatus, also called an overcharge safety device or OSD for short, provided is particularly a diaphragm inserted into the cell housing of a battery cell, particularly a diaphragm inserted into the cover of the cell housing of a battery cell, which diaphragm is electrically conductively connected to the positive pole of the battery cell. In this case, the diaphragm is curved into the cell housing, that is to say toward the cell interior, in the fault-free state, that is to say in the untripped state. When the pressure in the battery cell rises, the diaphragm is pushed outward, that is to say away from the cell interior, and makes electrically conductive contact with a contact bridge arranged on the negative pole of the battery cell. The electrically conductive connection produced in this manner between the diaphragm and the contact bridge advantageously has a lower electrical resistance than the chemically active part of the cell, which may be in the form of a jelly roll, for example, as a result of which the electric current flows no longer through the battery cell but rather via the cell housing of the battery cell. That is to say that a short circuit current develops. In order to interrupt the short circuit current developing via the cell housing and the chemically active part of the battery cell, the battery cell has the cell fuse. In the untripped state, this advantageously provides an electrically conductive connection from the chemically active part of the battery cell to the positive pole or to the cell housing of the battery cell. When an overcurrent occurs and hence particularly also when a short circuit current occurs, the cell fuse advantageously trips and hence interrupts the electrically conductive connection, so that no further current flows via the chemically active part of the battery cell.

Advantageously, the method according to the invention involves the cell current flowing via the tripped overvoltage protection apparatus being limited to a predetermined current limit value. This advantageously prevents the overvoltage protection apparatus, particularly the diagram of an overvoltage protection apparatus, from being damaged by an excessive current and hence no further current being able to flow via the cell housing, which would result in disconnection of the energy storage unit, in particular.

According to a further advantageous refinement of the method according to the invention, there is provision for a current sensor to be used to monitor whether an overcurrent has occurred in the energy storage unit. The current sensor provided therefor is particularly a Hall sensor and/or a shunt. When an overcurrent has occurred in the energy storage unit, a frequent cause thereof is an external short. Advantageously, the energy storage unit is therefore disconnected when an overcurrent is detected. Since an external short of this kind, for example a short caused by insulation damage on a battery cell, can lead to the cell fuse of the affected battery cell being tripped without the current sensor having detected the overcurrent occurring, monitoring for the occurrence of an overcurrent is an advantageous additional criterion. In this case, this is advantageously used in addition to monitoring of the tripping of an overvoltage protection apparatus.

In particular, there is further provision for the method according to the invention to involve the battery cells being monitored for a tripping of the cell fuse. In particular, there is provision for monitoring for whether the cell fuse has tripped, for example on account of an overcurrent caused by an external short, without the overvoltage protection apparatus having tripped. This can be effected particularly by means of monitoring of the battery cell voltage of the battery cells. If the battery cell voltage of a battery cell falls to zero volts, then this indicates that the cell fuse of this battery cell has tripped. In particular, the cell fuse may be a fusible link. If only the cell fuse has tripped, the energy storage unit is advantageously disconnected.

According to a particular preferred refinement of the method according to the invention, monitoring of the tripping of the overvoltage protection apparatus of a battery cell of the energy storage unit involves a check being performed to determine whether a cell current of the respective battery cell is not equal to zero amps and a battery cell voltage has a voltage value between a lower limit voltage value and an upper limit voltage value, the upper limit voltage value being less than the cell voltage minimum value and being greater than the lower limit voltage value. By way of example, the lower limit voltage value may be 0.2 volt, the upper limit voltage value may be 1.0 volt and the cell voltage minimum value may be 2.8 volts. If the criteria are met, this means that the cell fuse has tripped and the overvoltage protection apparatus has made an electrically conductive connection. This is because application of a battery cell voltage of this kind that lies within the limit values requires an operating current to occur in the energy storage unit and hence particularly a cell current to flow via the affected battery cell, and the cell current must therefore be not equal to zero amps. In this case, the cell current is preferably detected using a current sensor, particularly using a Hall sensor and/or a shunt. The battery cell voltage is preferably monitored using cell monitoring units, particularly by means of what are known as cell supervising circuits, called CSC for short.

A further particularly advantageous refinement of the method according to the invention provides for, in the event of a detected drop in the battery cell voltage of a battery cell of the energy storage unit below the cell voltage minimum value, the energy storage unit to be disconnected no earlier than after a predetermined time interval has elapsed. In particular, there is provision in this case for the energy storage unit to continue to be operated when tripping of the overvoltage protection apparatus of this battery cell is identified within this time interval. Preferably, the time interval is shorter than 1 second. In particular, there is provision for the time interval to be between $10^{-3}$ and $10^{-2}$ seconds. The time interval advantageously provides a time buffer that is preferably proportioned particularly such that factors such as, in particular, asynchronous detection of a drop in the battery cell voltage and of tripping of the overvoltage protection apparatus and/or signal propagation times and/or evaluation times are compensated for.

Advantageously, an identified tripping of the overvoltage protection apparatus of a battery cell of the energy storage unit is written to a fault memory as an event, particularly if the energy storage unit is a battery system used in a hybrid, plug-in hybrid or electric vehicle. As a result, it is advantageously a simplified matter to establish that the relevant battery cell or possibly the whole battery module needs replacing.

A further advantageous refinement of the method according to the invention provides for an identified tripping of the overvoltage protection apparatus of a battery cell of the energy storage unit to be signaled, preferably visually via a display apparatus and/or audibly. Particularly in the case of an energy storage unit that is used in a hybrid, plug-in hybrid or electric vehicle, there is provision for the signaling to involve an appropriate report being generated for a display apparatus of the vehicle in the field of vision of the vehicle driver.

In particular, there is further provision for identification of a tripping of an overvoltage protection apparatus of a battery cell of an energy storage unit used in an electric vehicle to prompt the vehicle to be switched to what is known as a limp home mode, which at least still allows a particular distance to be covered with the defective battery cell, particularly in order to be able to drive to a workshop.

The object cited at the outset is moreover achieved by proposing a battery management system for monitoring and regulating operation of an energy storage unit having a plurality of electrically interconnected battery cells, wherein the battery management system is designed to perform a method according to the invention. To this end, the battery management system comprises particularly a control unit, for example a microcontroller circuit. In this case, battery cell voltages are advantageously detected by means of what are known as cell monitoring units, which deliver detected battery cell voltage values to the battery management system, particularly to the control unit. Measured current values are advantageously detected using Hall sensors and/or shunts and likewise provided for the battery management system, particularly the control unit, for evaluation. In order to check whether particular limit values are observed, particularly at least one "comparator unit" is provided.

The object cited at the outset is moreover achieved by proposing an energy storage unit having a plurality of electrically interconnected battery cells and a battery management system for monitoring and regulating operation of the energy storage unit, wherein the battery management system is in the form of a battery management system according to the invention. That is to say that the battery management system of the energy storage unit according to the invention is particularly designed to perform a method according to the invention. Advantageously, the energy storage unit is an energy storage unit, particularly a battery system, that is designed to provide the electric power required for operation of a hybrid, plug-in hybrid or electric vehicle. In this case, the battery cells are preferably secondary battery cells, that is to say rechargeable storage battery cells, preferably lithium ion cells.

BRIEF DESCRIPTION OF THE DRAWINGS

Further advantageous particulars, features and refinement details of the invention are explained in more detail in connection with the exemplary embodiments presented in the figures, in which.

DETAILED DESCRIPTION

Figure 1A:
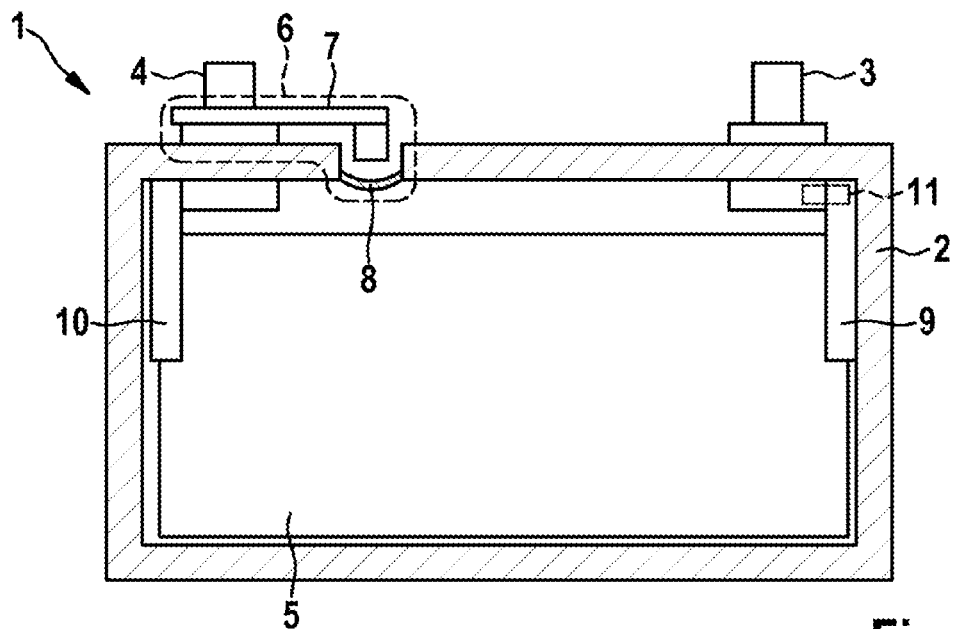
FIG. 1a shows a schematic representation of an exemplary embodiment of a battery cell known in the prior art with an untripped overvoltage protection apparatus.
Figure 1B:
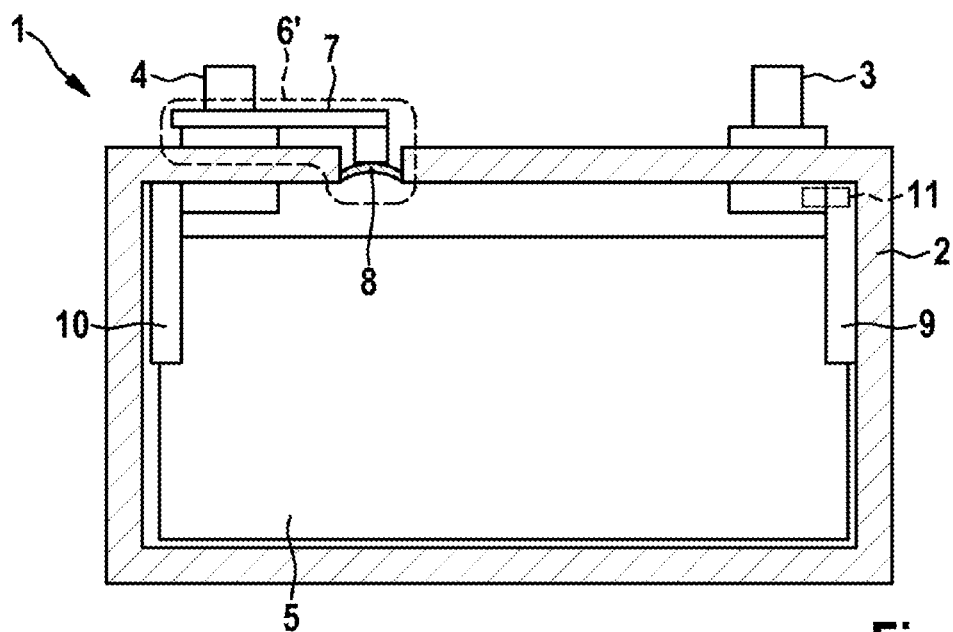
FIG. 1b shows a schematic representation of the battery cell represented in FIG. 1a with a tripped overvoltage protection apparatus.

FIG. 1a and FIG. 1b each show an exemplary embodiment of a battery cell 1 known in the prior art. Such a battery cell 1 may be particularly a battery cell of an energy storage unit according to the invention. In this case, the battery cell 1 in the exemplary embodiment shown is a lithium ion cell in the form of a prismatic cell.

In this arrangement, the battery cell 1 has a metal cell housing 2. The cell housing 2 has had an electrode arrangement 5 introduced into it, for example what is called a "jelly roll". The cathode and the anode of the electrode arrangement 5 have contact made with them by a first electrode 3 and a second electrode 4, which protrude as a cell terminal from the cell housing 2, via current collectors 9, 10.

The battery cell 1 further comprises an overvoltage protection apparatus, which is particularly also referred to as an "Overcharge Safety Device". When the pressure within the cell housing 2 rises, for example as a result of the critical heating of the battery cell 1 that is brought about by overcharging of the battery cell, the overvoltage protection apparatus 6 trips, as represented in FIG. 1b. In this case, the tripped overvoltage protection apparatus 6' produces an electrically conductive connection between the first electrode 3 and the second electrode 4 via the cell housing 2. The overvoltage protection apparatus 6 of the battery cell 1 comprises particularly a diaphragm 8, which is introduced into a cell housing opening, and a contact bridge 7 in this case. In the untripped state, the diaphragm 8 is curved toward the cell interior, as represented in FIG. 1a. When the pressure inside the cell housing 2 increases, the diaphragm 8 curves outward until the diaphragm 8 makes electrically conductive contact with the contact bridge 7, as represented in FIG. 1b. In this case, a short circuit current usually develops via the electrode arrangement 5 and the cell housing 2, said short circuit current resulting in tripping of the cell fuse 11 of the battery cell 1.

Figure 2:
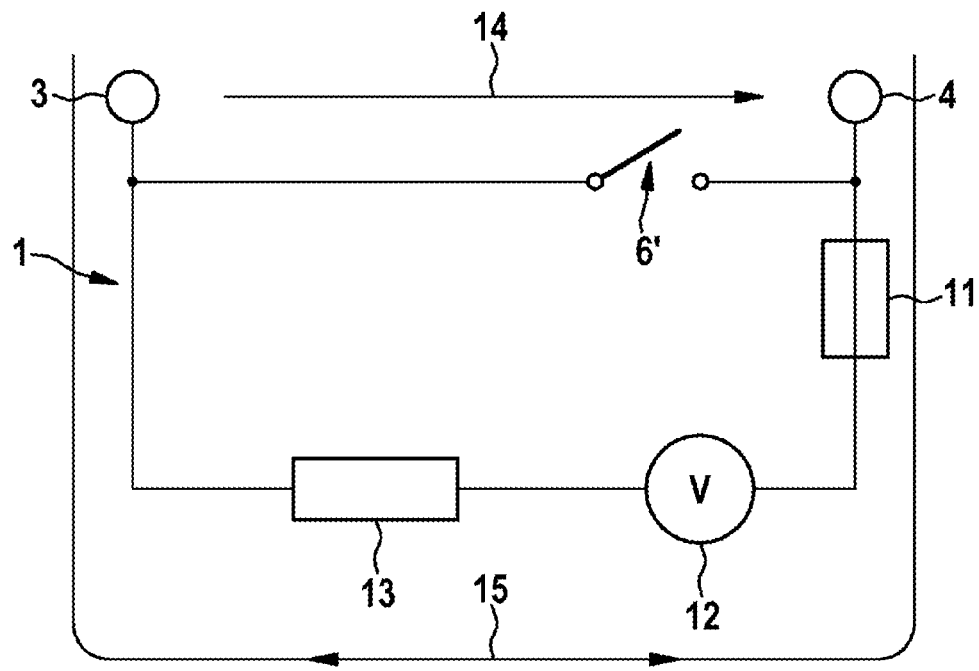
FIG. 2 shows a simplified equivalent circuit diagram for a battery cell with an untripped overvoltage protection apparatus.

With reference to FIG. 2 to FIG. 5, a method according to the invention is explained in more detail. In this case, FIG. 2 to FIG. 4 each represent a simplified equivalent circuit diagram for a battery cell 1. In this case, an equivalent power source 12 represents the voltage that is providable by the battery cell 1. The internal resistance of the battery cell 1, which is definitively determined by the electrode arrangement of the battery cell, for example the jelly roll, is represented by an equivalent resistor 13 in the respective equivalent circuit diagram. The battery cell 1 represented as an equivalent circuit diagram in FIG. 2 to FIG. 4 comprises a first electrode 3 and a second electrode 4, by means of which the battery cell 1 is connected up to further battery cells, which are not represented in FIG. 2 to FIG. 4, to form an energy storage unit. In particular, multiple such battery cells 1 represented as an equivalent circuit diagram in FIG. 2 are electrically interconnected in the series circuit and/or in a parallel circuit in this case and therefore form an energy storage unit. The battery cell 1 further comprises an overvoltage protection apparatus 6 and a cell fuse 11, particularly a fusible link.

Figure 3:
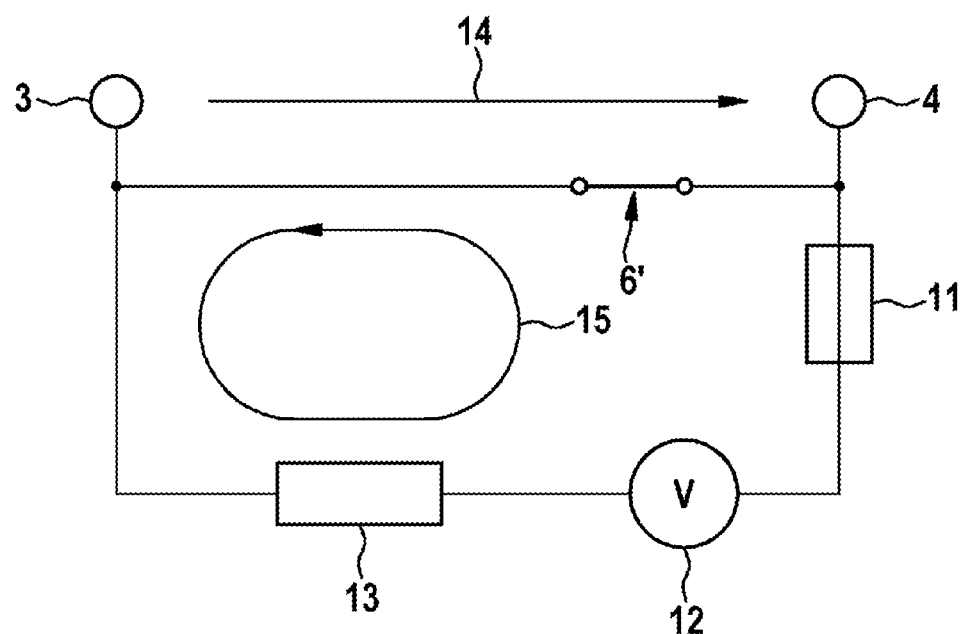
FIG. 3 shows a simplified equivalent circuit diagram for a battery cell with a tripped overvoltage protection apparatus.
Figure 4:
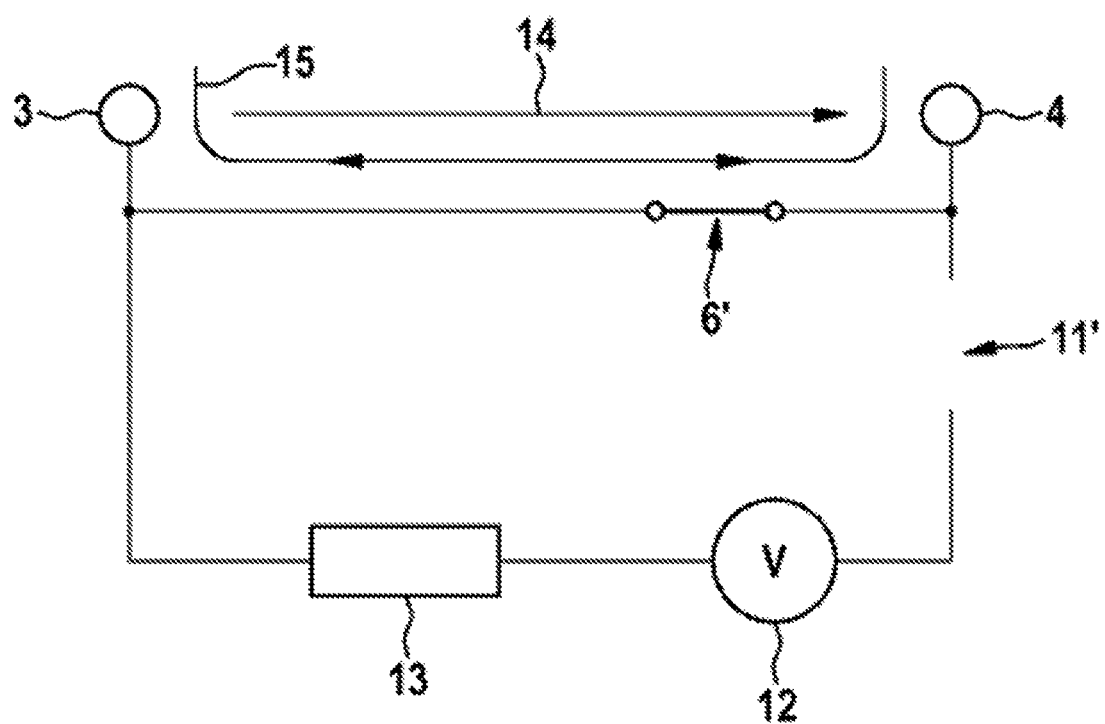
FIG. 4 shows a simplified equivalent circuit diagram for a battery cell with a tripped overvoltage protection apparatus and a tripped cell fuse.
Figure 5:
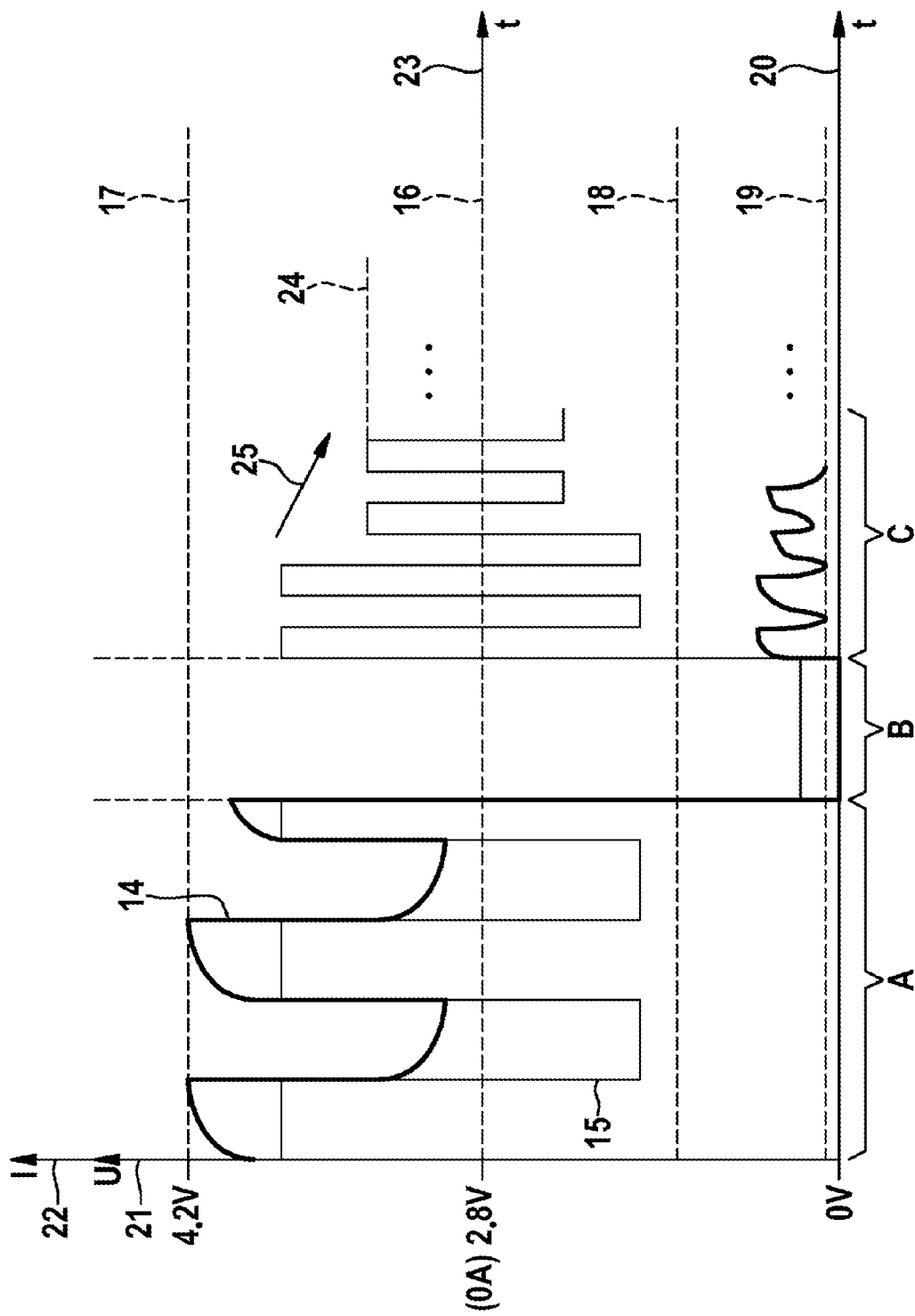
FIG. 5 shows a simplified representation of a cell current profile and a cell voltage profile for a battery cell during operation of an energy storage unit according to the invention.

In this case, FIG. 2 represents a normal, fault-free mode of the battery cell 1 within an energy storage unit. FIG. 3 represents the battery cell 1 with a tripped overvoltage protection apparatus 6'. FIG. 4 represents the battery cell 1 with a tripped overvoltage protection apparatus 6' and a tripped cell fuse 11'. In this case, FIG. 5 shows the profile of the cell current 15 and of the battery cell voltage 14 by way of example. In this case, section A is associated with FIG. 2, section B is associated with FIG. 3 and section C is associated with FIG. 4. The axes 20, 23 in FIG. 5 represent the time values, the axis 21 represents the voltage values and the axis 22 represents the current values.

During the fault-free operation shown in FIG. 2, a battery cell voltage 14 is dropped between the first electrode 3 and the second electrode 4 of the battery cell 1, and a cell current 15 flows from the first electrode 3 to the second electrode 4, or vice versa, via the internal resistance 13. In this regard, FIG. 5 represents a profile for the battery cell voltage 14 and for the cell current 15 by way of example in section A. During normal operation, the battery cell voltage 14 is in this case greater than a predetermined cell voltage minimum value 16, which is defined as 2.8 volts in the exemplary embodiment. Furthermore, during normal operation, the battery cell voltage 14 is less than a predetermined cell voltage maximum value, which is defined as 4.2 volts in the exemplary embodiment. Within these limit values, deep discharge and overcharging of the battery cell 1, in particular, are prevented.

The profile of the cell current 15 is dependent particularly on whether the battery cell 1 is charged or whether power is drawn from the battery cell 1. According to the method according to the invention, the respective battery cell voltage 14 applied to a battery cell 1 of the energy storage unit is monitored for whether it is greater than the prescribed cell voltage minimum value 16, that is to say greater than 2.8 volts in the present exemplary embodiment. In this case, there is particularly provision for the energy storage unit to be disconnected in the event of a drop in the battery cell voltage 14 below the cell voltage minimum value 16. However, the energy storage unit continues to be operated when, in addition to a drop in the battery cell voltage 14 below the cell voltage minimum value 16, tripping of the overvoltage protection apparatus 6 of the battery cell 1 is identified.

FIG. 3 provides an exemplary representation of the overvoltage protection apparatus 6 having tripped. To this end, the tripped overvoltage protection apparatus is represented by the reference symbol 6' in FIG. 3. On account of the tripping of the overvoltage protection apparatus 6, a short circuit current develops as a cell current 15 within the battery cell 1. In this case, the battery cell voltage 14 dips, this being represented in section B in FIG. 5. Section B, represented in FIG. 5, in which the battery cell voltage 14 assumes a value of 0 volt and the absolute value of the cell current 15 rises, lasts for a few milliseconds in this case, and then the cell current 15, which becomes larger on account of the short, trips the cell fuse 11, this being represented by way of example in FIG. 4.

On account of the tripped cell fuse 11', no further current flows via the battery cell 1 or the electrode arrangement, represented by the internal resistance 13, of the battery cell 1, but rather a cell current 15 flows via the cell housing of the battery cell 1 and the tripped overvoltage protection apparatus 6'.

On account of the non-zero-resistance electrically conductive connection via the cell housing and the tripped overvoltage protection apparatus 6', a battery cell voltage 14 is dropped between the first electrode 3 and the second electrode 4. This battery cell voltage 14 is, as represented in section C in FIG. 5, greater than 0 voltage but less than the cell voltage minimum value 16. In particular, the battery cell voltage assumes values between a predetermined lower limit voltage value 19 and an upper limit voltage value 18.

The method according to the invention, which involves the battery cell voltage being monitored, is advantageously used in this case to identify tripping of the overvoltage protection apparatus 6 and of the cell fuse 11, so that despite a drop in the battery cell voltage 14 below the cell voltage minimum value 16, the energy storage unit is not disconnected.

In this case, the method according to the invention is used first of all to identify the drop in the battery cell voltage 14 below the cell voltage minimum value after tripping of the overvoltage protection apparatus 6, that is to say on the transition from section A to section B. Within a time interval that is longer than section B shown in FIG. 5, a check is firstly performed to determine whether the cell current 15 has assumed a value different than zero amp. Additionally, a check is performed to determine whether the battery cell voltage 14 is between the lower limit voltage value 19 and the upper limit voltage value 18. Since both conditions are satisfied, it is established that the overvoltage protection apparatus 6 and the cell fuse 11 have tripped. The energy storage unit therefore continues to be operated with the defective battery cell 1.

Particularly in order to prevent the tripped overvoltage protection apparatus 6' from being damaged by an excessive cell current 15, the maximum permissible current for the energy storage unit is reduced and hence the cell current 15 is reduced to a predetermined current limit value 24. This reduction is represented by way of example in FIG. 5 by the arrow 25. Advantageously, the energy storage unit therefore continues to be operable.

Figure 6:
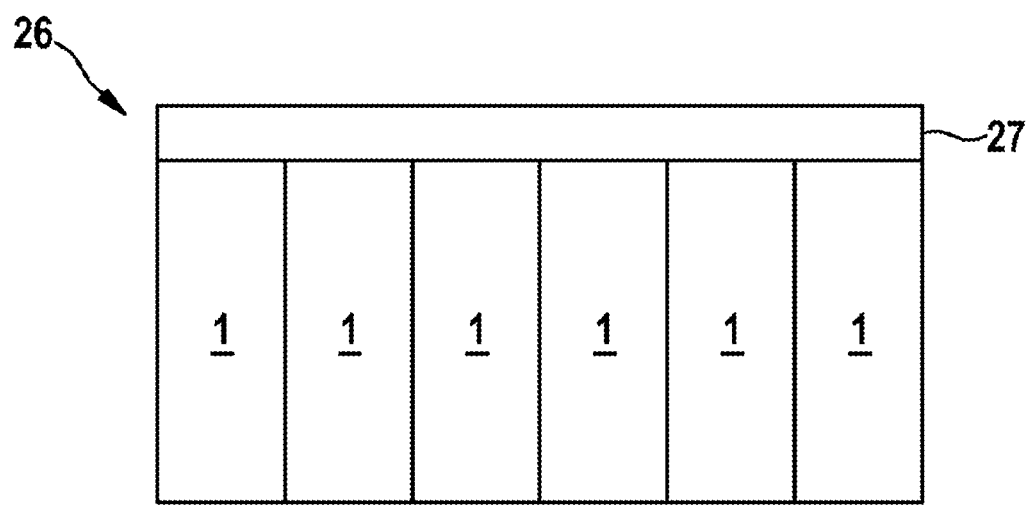
FIG. 6 shows a simplified schematic representation of an exemplary embodiment of an energy storage unit according to the invention.

FIG. 6 provides a simplified schematic representation of an energy storage unit 26 according to the invention. Said energy storage unit is in the form of a battery module and comprises a plurality of electrically interconnected battery cells 1, which may be designed particularly as explained in connection with FIG. 1a and FIG. 1b. In this arrangement, the battery cells 1 are electrically interconnected, particularly electrically connected up in series. To this end, the battery cells 1 are electrically conductively connected to one another via cell connectors integrated in the battery module cover 27. Furthermore, a battery management system, which is not represented explicitly in FIG. 6, is integrated in the battery module cover 27, the battery management system being designed to monitor and regulate operation of the energy storage unit 26. In particular, the battery management system is designed to perform a method according to the invention, particularly a method according to the invention as explained in connection with FIG. 2 to FIG. 5.

The exemplary embodiments represented in the figures and explained in connection therewith serve to explain the invention and are nonlimiting therefor.

The invention claimed is:

1. A method for operating an energy storage unit (26) having a plurality of electrically interconnected battery cells (1) that each comprise an overvoltage protection apparatus (6) and a cell fuse (11), wherein a respective battery cell voltage (14) applied to a battery cell (1) of the energy storage unit (26) is monitored for whether it is greater than a prescribed cell voltage minimum value (16), the energy storage unit (26) being disconnected in the event of a drop in the battery cell voltage (14) below the cell voltage minimum value (16), characterized in that the battery cells (1) are monitored for a tripping of the respective overvoltage protection apparatus (6), wherein the energy storage unit (26) continues to be operated when a battery cell voltage (14) of a battery cell (1) of the energy storage unit (26) drops below the cell voltage minimum value (16) and, in the process, tripping of the overvoltage protection apparatus (6) of this battery cell (1) is identified.

2. The method as claimed in claim 1, characterized in that the cell current (15) flowing via the tripped overvoltage protection apparatus (6') is limited to a predetermined current limit value (24).

3. The method as claimed in claim 1, characterized in that a current sensor monitors whether an overcurrent has occurred in the energy storage unit (26).

4. The method as claimed in claim 1, characterized in that the battery cells (1) are monitored for a tripping of the cell fuse (11).

5. The method as claimed in claim 1, characterized in that monitoring of the tripping of the overvoltage protection apparatus (6) of a battery cell (1) of the energy storage unit (26) involves a check being performed to determine whether a cell current (15) of the respective battery cell (1) has a value not equal to zero amps and a battery cell voltage (14) has a voltage value between a lower limit voltage value (18) and an upper limit voltage value (19), the upper limit voltage value (19) being less than the cell voltage minimum value (16) and being greater than the lower limit voltage value (18).

6. The method as claimed in claim 1, characterized in that in the event of a detected drop in the battery cell voltage (14) of a battery cell (1) of the energy storage unit (26) below the cell voltage minimum value (16), the energy storage unit (26) is disconnected no earlier than after a predetermined time interval has elapsed, wherein the energy storage unit (26) continues to be operated when tripping of the overvoltage protection apparatus (6) of this battery cell (1) is identified within this time interval.

7. The method as claimed in claim 1, characterized in that an identified tripping of the overvoltage protection apparatus (6) of a battery cell (1) of the energy storage unit (26) is written to a fault memory as an event.

8. The method as claimed in claim 1, characterized in that an identified tripping of the overvoltage protection apparatus (6) of a battery cell (1) of the energy storage unit (26) is signaled.

9. A battery management system for monitoring and regulating operation of an energy storage unit (26) having a plurality of electrically interconnected battery cells (1), characterized in that the battery management system is designed to perform a method as claimed in claim 1.

10. An energy storage unit (26) having a multiplicity of electrically interconnected battery cells (1) and a battery management system for monitoring and regulating operation of the energy storage unit (26), characterized in that the battery management system is a battery management system as claimed in claim 9.

\* \* \* \* \*